United States Patent [19]
Humphrey et al.

[11] 3,876,923
[45] Apr. 8, 1975

[54] INVERTER PARALLELING FOR HARMONIC REDUCTION

[75] Inventors: Andrew J. Humphrey, Manchester, Conn.; James W. A. Wilson, Ann Arbor, Mich.

[73] Assignee: Reliance Electric Company, Cleveland, Ohio

[22] Filed: Nov. 28, 1973

[21] Appl. No.: 419,813

[52] U.S. Cl. .................... 321/27 R; 318/227; 321/5
[51] Int. Cl. ............................................ H02m 1/12
[58] Field of Search .......... 318/227; 321/5, 9 R, 27, 321/27 MS, 26

[56] References Cited
UNITED STATES PATENTS

| | | | |
|---|---|---|---|
| 3,346,794 | 10/1967 | Stemmler | 321/5 X |
| 3,781,615 | 12/1973 | Mokrytzki et al. | 321/9 R |
| 3,781,616 | 12/1973 | Mokrytzki et al. | 321/9 R |
| 3,781,635 | 12/1973 | Sauer | 321/9 R |
| 3,792,286 | 2/1974 | Meier | 321/9 R X |

*Primary Examiner*—R. N. Envall, Jr.
*Attorney, Agent, or Firm*—Woodling, Krost, Granger & Rust

[57] ABSTRACT

The invention describes a means for reducing the harmonic content of two or more paralleled polyphase inverters by displacing the phase relationship of the outputs of these inverters and connecting them through intervening reactors to a load circuit, which may be a motor or an output transformer, whose windings are phase displaced by the same amount as the inverter outputs. The load circuit includes a load winding with phase and auxiliary windings on one common magnetic circuit. The phase and auxiliary windings are conductively connected to each other and to two sets of terminals of the load winding so that the voltage on one terminal set is phase displaced from the voltage on the other terminal set by an angle corresponding to the phase displacement between the inverter outputs.

14 Claims, 13 Drawing Figures

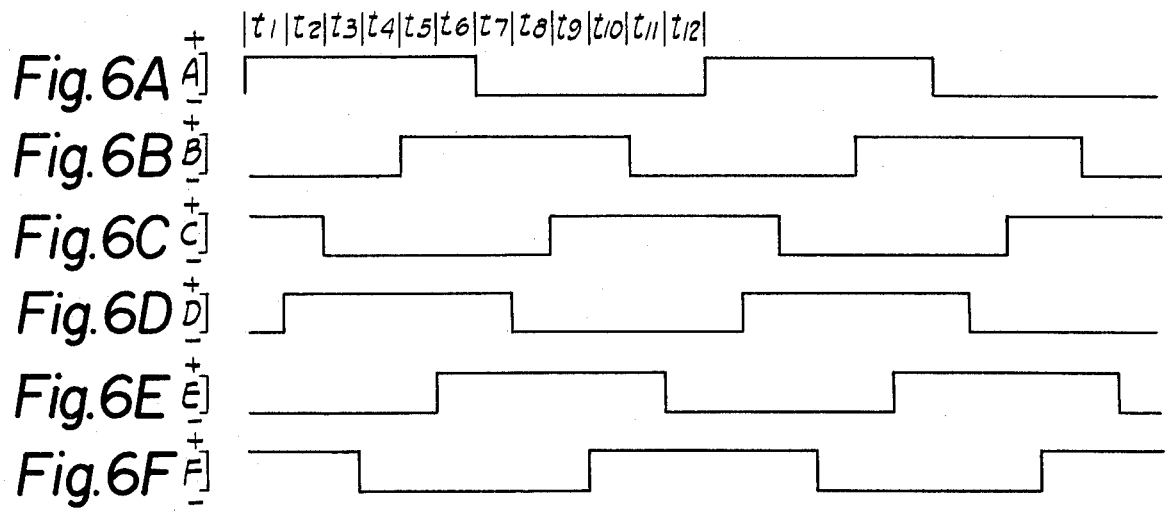
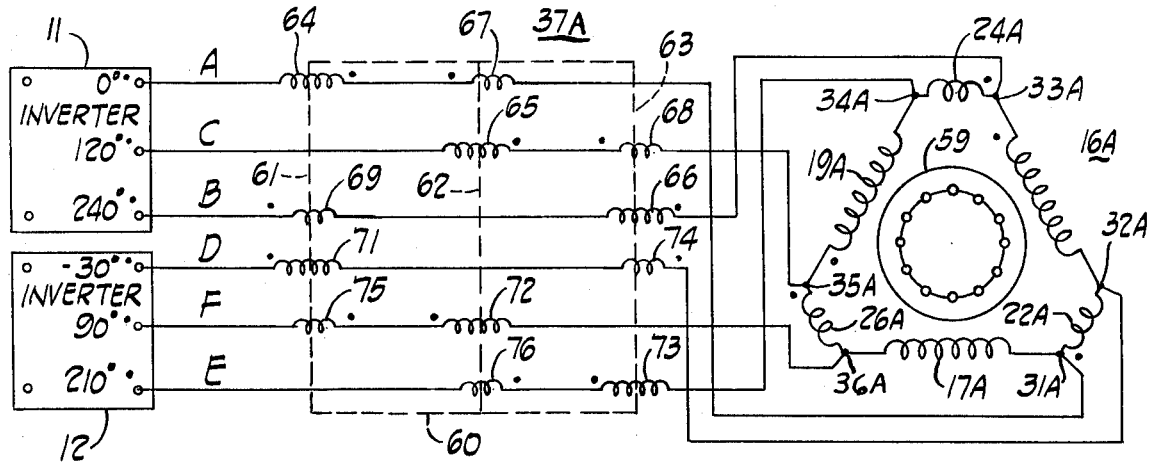
Fig. 7
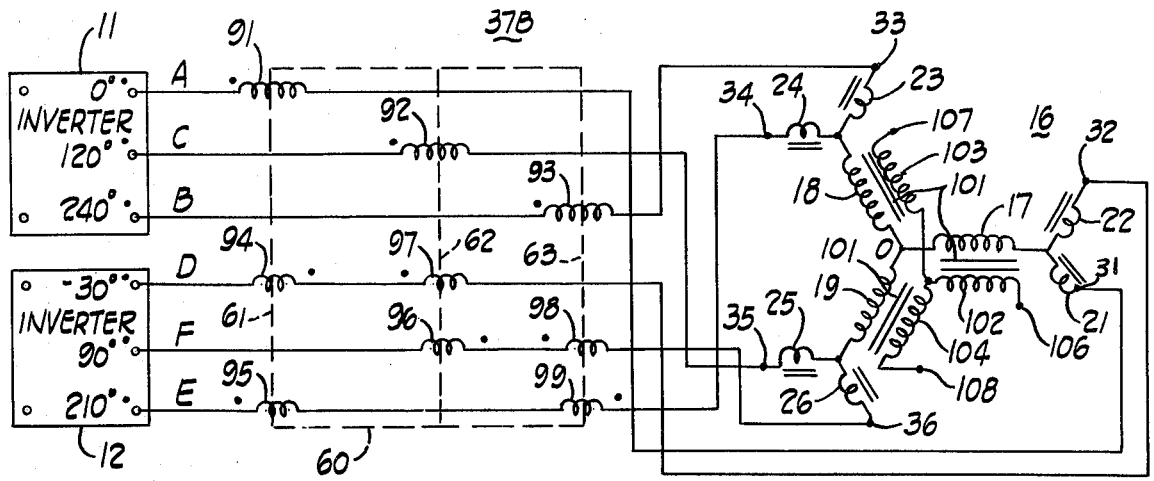
Fig. 8

INVERTER PARALLELING FOR HARMONIC REDUCTION

The foregoing abstract is merely a resume of one general application, is not a complete discussion of all principles of operation or applications, and is not to be construed as a limitation on the scope of the claimed subject matter.

BACKGROUND OF THE INVENTION

This invention relates to load circuits and more particularly to mutually inductive load circuits for operation with a first and a second converter.

The principle of paralleling two power converters in order to increase power to a load has been utilized in many types of applications. Many power converters incorporate semi-conductor devices which are limited in power output thus requiring several power converters to be connected in parallel to a load in order to achieve the desired power output. In the application of power inverters changing direct current into alternating current, additional benefits can be obtained by paralleling two inverters to a load circuit. If one inverter is established to have a phase angle relative to the other inverter, then the resultant voltage wave form to the load is a composite of the two inverter wave forms which more closely approximates the desired sine wave pattern. One necessary requirement for such an arrangement is the connection of reactor means between each inverter and the load device to absorb or cancel voltage differences. The wave forms of the inverters have to be arranged to reduce the fundamental and harmonic components supported by the reactor means in order to minimize the size of the reactor means.

The prior art disclosed the connection of a first and second inverter with a first and a second electrically isolated polyphase load winding wherein the first and second polyphase load windings are physically displaced by an angle corresponding to the phase angle between the first and second inverters; for example, application Ser. No. 187,974, filed Oct. 12, 1971 now U.S. Pat. No. 3,792,286, and U.S. Pat. No. 3,611,085, issued Oct. 3, 1971. The resultant voltage in the two load windings is a single wave form which is the composite of the two wave forms of the first and second inverters. One disadvantage of this scheme was that two separate load windings were required which are electrically insulated from one another making the construction costly. Another disadvantage was that this scheme was incapable of operation into a three-phase transformer load. In addition, the extra insulation required to isolate the load windings adds to the size of the winding and reduces the ability of the windings to dissipate heat.

Therefore, an object of this invention is to provide a mutually inductive load winding circuit for operation with parallel inverters which comprises a single polyphase winding.

Another object of this invention is to provide a mutually inductive load winding circuit for operation with parallel inverters which requires only minor modifications of existing load windings.

Another object of this invention is to provide a mutually inductive load winding circuit for operation with parallel inverters which does not require additional insulation thus increasing the size of the load winding.

Another object of this invention is to provide a mutually inductive load winding circuit for operation with parallel inverters which is more economical to construct than similar windings incorporating a plurality of load windings.

Another object of this invention is to provide a mutually inductive load winding circuit for operation with parallel inverters with substantially reduced fundamental and harmonic components within the reactor means interconnecting the parallel inverters and the load winding.

SUMMARY OF THE INVENTION

The invention may be incorporated in a load circuit for operation with a first and a second power converter wherein the output of the first converter has a phase angle relative to the output of the second converter comprising in combination a load winding having a phase winding for each phase of one of the converters and having auxiliary winding means, first terminals equal in number to the phases of the first converter, second terminal means having terminals equal in number to the phases of the second converter, means connected between the first and second converters and said first and second terminal means, respectively, for absorbing voltage differences, and means for connecting said phase and auxiliary winding means to said terminal means to have said first terminal means of said load winding electrically displaced from said second terminal means of said load winding by an angle corresponding to the phase angle between the converters.

Other objects and a fuller understanding of the invention may be had by referring to the following description and claims, taken in conjunction with the accompanying drawing.

BRIEF DESCRIPTION OF THE DRAWINGS

FIG. 6 A-F illustrates various wave forms present in FIG. 1;

FIG. 7 is a modification of FIG. 1; and,

FIG. 8 is another modification of FIG. 1.

DESCRIPTION OF THE PREFERRED EMBODIMENT

Figure 1:
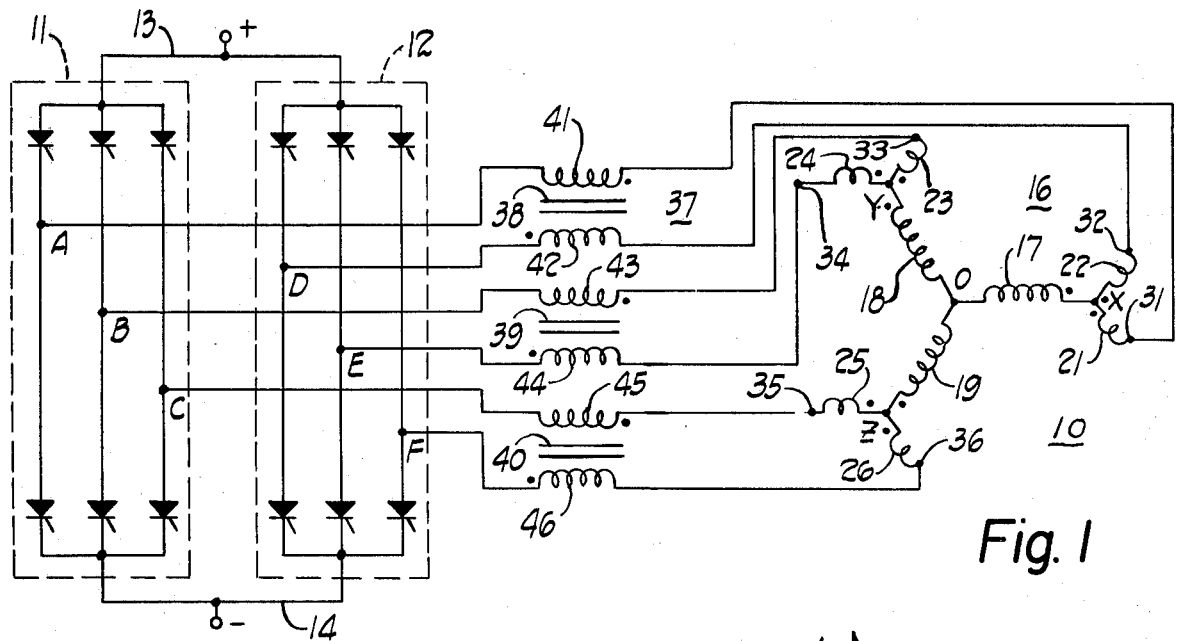
FIG. 1 is the preferred embodiment showing a first and a second inverter connected to a mutually inductive load winding circuit.

FIG. 1 is the preferred embodiment showing a mutually inductive load circuit 10 for operation with a first and a second power converter 11 and 12 wherein the first power converter 11 has a phase angle relative to the second power converter 12. The first and second power converters are shown as three-phase bridge inverters wherein the first inverter 11 has phases A, B, and C, and the second inverter 12 has phases D, E, and F. However, it is understood that any type of power converter wherein the first power converter has a phase angle relative to the second power converter is equally applicable to this invention. The first and second power inverters 11 and 12 have thyristors to connect each phase to either a positive bus 13 or a negative bus 14.

The load circuit 10 includes a load winding 16, having a phase winding for each phase of the inverters and in this embodiment load winding 16 has three phase windings 17, 18, and 19. The phase windings 17–19 are connected in a forked arrangement with one end of each of the phase windings 17–19 connected to a common connection 0. The other ends of each of the phase windings 17–19 are connected to auxiliary winding means which includes auxiliary windings 21–26. The auxiliary windings 21 and 22 are connected to the end of phase winding 17, auxiliary windings 23 and 24 are connected to the end of phase winding 18 and auxiliary windings 25 and 26 are connected to the end of phase winding 19. The load circuit 10 includes first terminal means and second terminal means having terminals equal in number to the phases of the first and second inverters 11 and 12, respectively, and in this embodiment the first terminal means includes a first set of terminals 31, 33, and 35 whereas the second terminal means includes a second set of terminals 32, 34, and 36. The first and second inverters 11 and 12 are respectively connected to the first and second terminal means 31–36 by means 37 shown as reactor means which is able to absorb voltage differences between the load winding 16 and the first and second inverters 11 and 12. The reactor means 37 may be a polyphase reactor but is shown as a plurality of reactors 38, 39, and 40, each reactor having a first and second reactor coil or reactor winding. Reactor 38 has a first reactor coil 41 and a second reactor coil 42, reactor 39 has a first reactor coil 43 and a second reactor coil 44 and reactor 40 has a first reactor coil 45 and a second reactor coil 46. The first reactor coils 41, 43, and 45 of the reactors 38–40 connect the first inverter 11 to the first terminals 31, 33, and 35, whereas the second reactor coils 42, 44, and 46 connect the second inverter 12 to the second terminals 32, 34, and 36. The phase windings 17–19 and the auxiliary windings 21–26 are connected to the terminals 31-36 to have the phase windings 17–19 symmetrically spaced with respect to one another with the first terminals 31, 33, and 35 of the polyphase load winding 16 electrically displaced from the second terminals 32, 34, and 36 of the polyphase load winding 16 by an angle corresponding to the phase difference between the first and second inverters 11 and 12.

Figure 2:
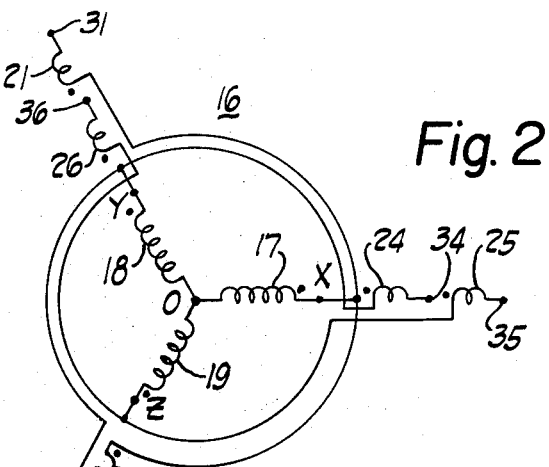
FIG. 2 is a circuit diagram of the load winding shown in FIG. 1.

FIG. 2 shows the winding connection of the load winding 16 with the phase windings 17–19 symmetrically spaced 120° relative to one another for a three-phase system with two auxiliary windings established in the same electrical vector orientation as each of the phase windings. The phase winding 17 has the auxiliary windings 24 and 25 established in the same electrical vector orientation, phase winding 18 has auxiliary windings 26 and 21 in the same electrical vector orientation and phase winding 19 has auxiliary windings 22 and 23 in the same electrical vector orientation. The actual winding may be arranged in a lap winding for example, with a portion of a lap winding being a phase winding and a portion of a lap winding being an auxiliary winding. Consequently, only a minor change of existing windings is necessary to incorporate this invention. The auxiliary windings connected to each of the respective phase windings is established at an angle relative to the direction of the phase winding so that the vectors of the voltages across the auxiliary and phase windings produce a resultant voltage vector which is displaced from the vector of the phase winding alone. For example, the phase winding 17 is in series with the auxiliary winding 21 which is displaced 120° relative to the phase winding 17 and when a current passes between the terminal 31 and the neutral connection point 0, the resultant voltage thereacross is the vectorial sum of the voltages across the phase winding 17 and the auxiliary winding 21.

Figure 3:
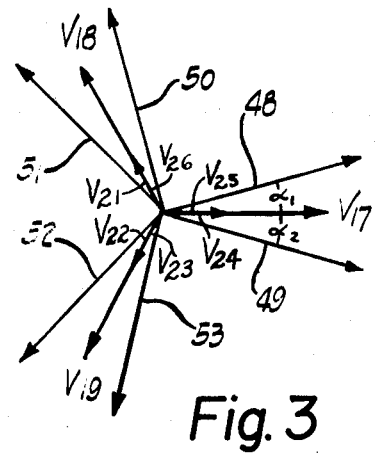
FIG. 3 is a vector diagram of the voltages of the load winding shown in FIG. 1.

FIG. 3 is a vector diagram of the windings shown in FIGS. 1 and 2 illustrating the voltage produced by each phase and auxiliary winding. The large vector components $V_{17}$, $V_{18}$, and $V_{19}$ are the voltages across the phase windings 17–19, respectively, whereas the small vector components $V_{21}$–$V_{26}$ are the voltages across the auxiliary windings 21–26, respectively. For example, the resultant voltage across the phase winding 17 and the auxiliary winding 22, is shown by a vector 48 which forms an angle $\alpha_1$ relative to the direction of the vector $V_{17}$. Similarly, the resultant voltage across phase winding 17 and the auxiliary winding 21 is shown by a resultant vector 49 which forms an angle $\alpha_2$ relative to the direction of the vector $V_{17}$. Resultant vectors 50–53 correspond to the phase windings 18 and 19 in conjunction with the respective auxiliary windings from the group 21–23, and 26. The arrangement of the phase and auxiliary windings shown in FIGS. 1–3 provides the single polyphase load winding 16 having resultant voltage vectors equal to two separate and electrically insulated polyphase windings. The proper interconnection of the phase and auxiliary windings produces an electrical displacement between the first and second terminal means corresponding to the phase angle between the first and second inverters 11 and 12. For example, if the first inverter 11 is leading the second inverter 12 by 30°, then the sum of $\alpha_1$ and $\alpha_2$ in FIG. 3 would equal 30°. By instituting the proper firing order of the A–F phases of the first and second inverters 11 and 12, the single polyphase load winding 16 can function as the two electrically isolated polyphase windings as known to the prior art.

Figure 4:
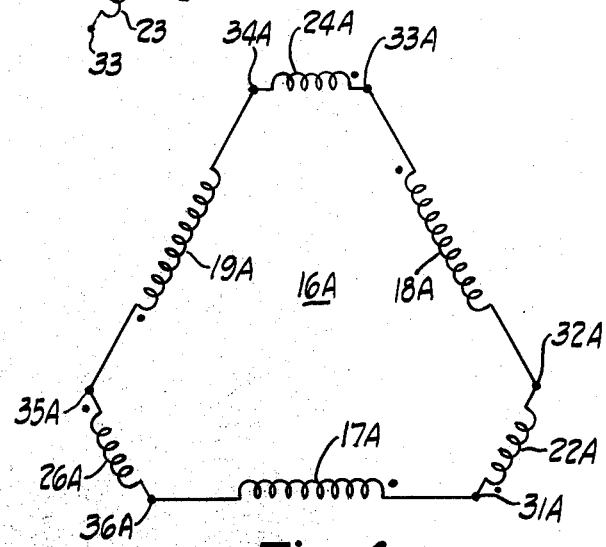
FIG. 4 is an alternative load winding suitable for operation with the circuit shown in FIG. 1.

FIG. 4 illustrates an alternative arrangement including phase windings 17A, 18A, and 19A and auxiliary windings 22A, 24A, and 26A established in a ring winding 16A and which is compatible for operation in place of the load circuit 16 of FIG. 1. The phase windings 17A–19A are connected in series with the auxiliary windings 22A, 24A, and 26A. The windings are arranged such that an auxiliary winding is interposed between two phase windings. At the junction of each of the phase and auxiliary windings, is one terminal of first and second terminal means 31A–36A.

Figure 5:
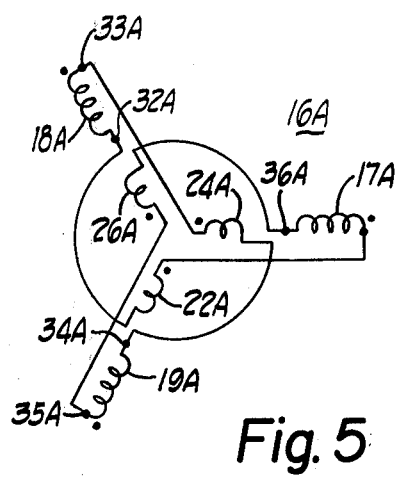
FIG. 5 is a circuit diagram of the load winding shown in FIG. 4.

FIG. 5 is a wiring diagram of the ring winding 16A shown in FIG. 4. The auxiliary winding 24A is wound with the same electrical vector orientation as the phase winding 17A, the auxiliary winding 26A is wound with the same electrical vector orientation as the phase winding of 18A and the auxiliary winding 22A is wound with the same electrical vector orientation as the phase winding 19A. The ring winding 16A requires only a single auxiliary winding for each phase winding whereas the forked winding requires two auxiliary windings for each phase winding of the inductive load winding.

The operation of the preferred embodiment shown in FIG. 1 with either the forked winding shown in FIGS. 1–3 or the ring winding shown in FIGS. 4 and 5 can best be appreciated by referring to FIG. 1 in conjunction with FIG. 6 A-F. FIGS. 6 A-F illustrate the voltage wave forms relative to the negative bus 14 present as a function of time at phases A-F, respectively. These wave forms are produced by proper control to the three-phase thyristor bridge circuits of the inverters 11 and 12 which control circuits are well-known to the art. The wave forms of FIG. 6 A-F produce two patterns for each phase windings, the first pattern having four terminals at one potential and two terminals at the other potential and the second pattern having three terminals at each potential. In the time designated $t_1$ positive conventional current will flow from phase A of the first inverter 11 and through the reactor coil 41, auxiliary windings 21 and 22, and the reactor coil 42 to phase D of the second inverter 12. Simultaneously, currents flow from phases C and F through reactor coils 45 and 46, auxiliary windings 25 and 26 respectively, to phase windings 19 and 18. The current from phase winding 18 flows through auxiliary windings 23 and 24, and reactor coils 43 and 44 to phases B and E. The flux produced by the auxiliary windings 24 and 25 are equal and opposite and cancel one another. If each of the phase windings 17-19 are assumed to be, for example, 2.73 times the turns of each of the auxiliary windings 21-26, then the potential at point X between the auxiliary windings 21 and 22 is midway between the positive and negative buses 13 and 14 and the common connection point 0 of the phase windings 18 and 19 is at the same potential.

Since the windings 18, 21, and 26 are magnetically coupled, and windings 19, 22, and 23 are magnetically coupled, as shown in FIG. 2, and since the turns of the phase windings are assumed to be 2,73 times the auxiliary windings, and since X and 0 are at the same potential, then a discrepancy in voltage exists which is absorbed by the reactors 38-40. The action of the reactor is explained in an application Ser. No. 187,974 filed Oct. 12, 1971, owned by the assignee of this invention and that explanation is hereby incorporated into this disclosure by reference. Also the action of the reactor is found in U.S. Pat. No. 3,611,085 issued Oct. 5, 1971.

During the period designated $t_2$ in FIGS. 6A-F, the current flow through the inductive load winding 16 is modified relative to the current flow in period $t_1$. Positive conventional currents flow from phases A and D through reactor coils 41 and 42, auxiliary windings 21 and 22, respectively to phase windings 17 and 18. Simultaneously, currents flow from phases C and F through reactor coils 45 and 46, auxiliary windings 25 and 26, respectively to phase windings 19 and 18. The current from phase winding 18 is divided between auxiliary windings 23 and 24 to return to the B and E phase of the inverters by reactor coils 43 and 44. Again a discrepancy in voltage will appear which is absorbed by the reactor means 37 to enable paralleling of the first and second inverters 11 and 12. Continued analysis through times $t_3-t_{12}$ will yield similar results.

FIG. 7 illustrates a modification of the circuit shown in FIG. 1. The first and second inverters 11 and 12 are connected through reactor means 37A to inductive load winding 16A shown in FIG. 4. The inductive load winding 16A is oriented about a rotor 59 to form an A.c. induction motor. The reactor means 37A is a single polyphase reactor with the number of phases corresponding to the number of phases of each of the inverters 11 and 12. The reactor means 37A has a single magnetic core 60 with three legs 61, 62, and 63 and may be a flat core made from a stack of E-I laminations with reactor coils on each of the three legs 61-63. In this embodiment there are two major coils and two minor coils for each leg 61-63 of the reactor core 60.

The reactor coils are connected in a circuit with each inverter phase and its respective load terminal to cancel the fundamental frequency component of the flux within the reactor core 60. This flux cancellation is accomplished by having four coils on each reactor leg, two major coils and two minor coils. Major coils 64, 65, and 66 are respectively connected in series with minor coils 67, 68, andd 69 between the first inverter 11 and the first terminals 31A, 33A, and 35A of the winding 16A. Major coils 71, 72, and 73 are respectively connected in series with minor coils 74, 75, and 76 between the second inverter 12 and the second terminals 32A, 34A, and 36A of the load winding 16A. The phase outputs A, B, and C of the first inverter 11 have been designated as 0°, 240°, and 120°, supplying current to the first terminals of the inductive load circuit 16A. The second inverter 12 has a 30° phase displacement relative to the first inverter 11 and having phase outputs D, E, and F designated −30°, 210°, and 90°. Coils 64, 69, 71, and 75 are magnetically coupled on the leg 61; coils 65, 67, 72, and 76 are magnetically coupled on the leg 62 whereas coils 66, 68, 73, and 74 are magnetically coupled on the leg 63 of the reactor core 60. The combination of the first and second inverter through the reactor means 37A provides a 12-step motor voltage when each of the inverters 11 and 12 are providing a 6-step output wave form. The interaction of the flux on the reactor core 60 provides a true 12-step voltage to the inductive load winding 16A. A true 12-step voltage is one which has the proper amplitude of steps so that harmonics are reduced to a minimum. It has been established by the inventors in operating the invention in accordance with FIG. 7 that there is no fundamental component of voltage present in the reactor 37A only higher harmonics and primarily the fifth and seventh harmonic of the voltage when the displacement between inverters is 30°. The fifth and seventh harmonics have been neutralized and substantially canceled in the 12-step voltage wave form and appear substantially only across the reactor means 37A.

FIG. 8 is a further modification of the invention shown in FIGS. 1 and 7. The inverters 11 and 12 are the same type used in FIGS. 1 and 7, connected through reactor means 37B to a forked winding shown in FIG. 1. The forked winding 16 is the primary of a three-phase transformer which interconnects the inverters 11 and 12 to a load, not shown. The reactor means 37B includes a single core 60 which includes three legs 61, 62, and 63. The reactor 37B has been simplified over the reactor 37A having fewer coils including the major coils 91, 92, and 93 connected in series between the inverter 11 and the terminals 31, 33, and 35 of the loadd winding 16. Minor coils 94-99 are connected in pairs between the second inverter 12 and the second terminals 32, 34, and 36 of the forked winding 16. Reactor means 37B cancels the fundamental component in the reactor in a manner similar to reactor 37A in FIG. 7.

The load winding 16 is the primary of a three-phase transformer and is connected by magnetic core 101 to the secondary windings 102-104. The secondary windings 102-104 provide a three-phase output on terminals 106-108 to a load which is not shown. The core of the transformer must be a single three-phase core but the secondary winding may be either wye or delta connected. The advantage of providing a single load winding with an electrical displacement over a plurality of mechanically displaced windings of the prior art is apparent from the application to a three-phase transformer. Since the core has three legs, it is impractical to design a core with provisions to have two separate windings on each leg which are displaced in phase 30° relative to one another. The present invention has eliminated this problem by electrically displacing the phase windings by using auxiliary windings wound on other legs of the same transformer or load device core. Consequently, the present invention has extended the scheme of paralleling inverters to be applicable to a three-phase transformer to provide a 12-step output wave form at the secondary outputs 106–108 of the transformer. In this embodiment, the output of the first inverter preferably has a phase angle of an odd multiple of 30° relative to the output of the second inverter. This eliminates third harmonic current flow with a common output transformer winding.

The circuits shown in FIGS. 1–8 have illustrated a load circuit for operation with a first and a second power converter which has been shown as a first and second inverter wherein the first converter has a phase angle relative to the second inverter. The invention includes a load winding 16 having a phase winding for each phase of one of the converters. In this embodiment the converters have been shown to be three-phase but it is understood that this invention may be used with any polyphase system. Each of the phase windings has auxiliary winding means which auxiliary winding means includes at least one auxiliary winding. The auxiliary winding means in FIGS. 1–3 include two auxiliary windings whereas te auxiliary winding means in FIGS. 4 and 5 includes only a single auxiliary winding. The load circuit includes first terminal means having terminals equal in number to the phases of the first inverter and includes terminals 31, 33, and 35 corresponding to the three phases A, B, and C of the first inverter 11. The second terminal means has terminals equal in number to the phases of the second converter and includes terminals 32, 34, and 36 being equal in number to the phases D, E, and F of the second converter 12. The embodiment shows means 37 for absorbing voltage differences for connecting the first and second converters 11 and 12 and the first and second terminal means which means 37 is shown as reactor means including reactors 38–40. The invention also includes means for connecting the phase windings 17–19 with the terminals of the terminal means to have the first terminal means of the load winding 16 electrically displaced from the second terminal means of the load winding 16 by an angle corresponding to the phase angle between the first and second converters 11 and 12.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A load circuit for operation with a first and a second power converter wherein the output of the first converter has a phase angle relative to the output of the second converter, comprising in combination:
   a load winding having a phase winding for each phase of one of the converters and having inductively coupled auxiliary winding means on one common magnetic circuit;
   first terminal means of said load winding having terminals equal in number to the phases of the first converter;
   second terminal means of said load winding having terminals equal in number to the phases of the second converter;
   means connected between the first and second converters and said first and second terminal means, respectively, for absorbing voltage differences;
   and means for conductively connecting said phase and auxiliary winding means to each other and to said terminal means to have said first terminal means of said conductively connected load winding electrically displaced from said second terminal means of said load winding by an angle corresponding to the phase angle between the converters.

2. A load circuit as set forth in claim 1, wherein said means connected between the first and second converters and said first and second terminal means includes reactor means.

3. A load circuit as set forth in claim 1, wherein said means for connecting said phase and auxiliary winding means connects said phase windings to be symmetrically disposed with respect to one another.

4. A load winding as set forth in claim 1, wherein said auxiliary winding means includes at least one auxiliary winding for each phase winding.

5. A load winding as set forth in claim 4, wherein the first and second converters are polyphase converters;
   and said means for connecting said phase and auxiliary winding means connects said phase windings in series with said auxiliary windings with said auxiliary windings interposing said phase windings with one of said terminals at each connection of said phase and auxiliary windings.

6. A load winding as set forth in claim 4, wherein the first and second converters are polyphase converters;
   and said means for connecting said phase and auxiliary winding means interconnects said phase windings;
   and said means for connecting said phase and auxiliary winding means connects one of said auxiliary windings between each of said phase windings and a terminal of each of said first and second terminal means.

7. A load winding as set forth in claim 1, wherein the first and second power converters are inverters.

8. A load circuit for operation with a first and a second polyphase inverter wherein the first inverter output has a phase angle relative to the second inverter output, comprising in combination:
   a polyphase load winding on one common magnetic circuit and having a phase winding and at least one auxiliary winding for each phase of the first inverter;
   reactor means having first and second reactor coil means,
   a set of first polyphase terminals equal in number to the phases of the first inverter, a set of second polyphase terminals equal in number to the phases of the second inverter, means for connecting said first reactor coil means between the first inverter and said first terminals;

means for connecting said second reactor coil means between the second inverter and said second terminals;

and means for conductively connecting said phase and auxiliary windings to each other and to said terminals to have said phase windings symmetrically disposed with respect to each other with said first terminals of said polyphase conductively connected winding electrically displaced from said second terminals of said conductively connected polyphase load winding by an angle corresponding to the phase angle between the inverters.

9. A load circuit as set forth in claim 8, wherein said reactor means includes a reactor core leg for each of said phase windings.

10. A load circuit as set forth in claim 8, wherein said means for connecting said phase and auxiliary windings to said terminals connects said phase windings in series with said auxiliary windings with said auxiliary windings interposing said phase windings with one of said polyphase terminals at each connection of said phase and auxiliary windings.

11. A load circuit as set forth in claim 10, wherein said polyphase winding is a ring winding.

12. A load circuit as set forth in claim 8, wherein said means for connecting said phase and auxiliary windings to said terminals interconnects one end of each of said phase windings and connects one of said auxiliary windings between the other end of each of said phase windings and a terminal of each of said first and second sets of polyphase terminals.

13. A load circuit as set forth in claim 12, wherein said polyphase winding is a forked winding.

14. A load circuit as set forth in claim 8, wherein the phase angle of the first inverter output relative to the second inverter output is an odd multiple of 30°.

* * * * *